Patented Aug. 5, 1924.

1,504,125

UNITED STATES PATENT OFFICE.

WERNER LANGE, OF BERLIN-FRIEDENAU, AND LUDWIG NEUMANN, OF BERLIN, GERMANY, ASSIGNORS TO ACTIEN GESELLSCHAFT FÜR ANILIN FABRIKATION, OF BERLIN, GERMANY.

TETRAKISAZO DYES.

No Drawing.   Application filed August 23, 1922.   Serial No. 583,909.

*To all whom it may concern:*

Be it known that we, WERNER LANGE and LUDWIG NEUMANN, citizens of the German Republic, and residents of Berlin-Friedenau, Germany, and Berlin, Germany (our post-office address being Feurigstrasse 10, Berlin - Friedenau, Germany, and Pflugstrasse 9B, Berlin, Germany), have invented certain new and useful Improvements in Tetrakisazo Dyes, of which the following is a specification.

The object of our present invention are new valuable tetrakisazo dyes which dye cotton reddish brown tints of an excellent fastness. These new dyes derive from an aminoarylsulfonic acid 2 molecular proportions of middle components of the aromatic series, 1 molecular proportion of the benzene series and a 1.3-diamino-4-nitro compound of the benzene series.

They correspond to the general formula:

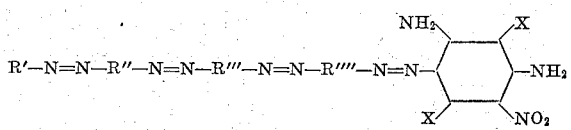

R′, R″, R‴ are aromatic radicals, R‴′ a radical of the benzene series, and X hydrogen or a univalent substituent.

The process of manufacture consists in combining a diazo-arylsulfonic acid with an azo-dye component capable of being diazotized after being combined, diazotizing the intermediate compound, combining it with an aromatic middle component, diazotizing the disazo dyestuff, combining with an aromatic middle component, diazotizing the new intermediate compound, combining it with a middle component of the benzene series, diazotizing again and combining with a nitro-meta-phenylenediamine derivative of the benzene series.

The new tetrakisazo dyes in the shape of pulverized dry sodium salts are dark brown powders soluble in water to reddish brown solutions, not being altered by soda lye but from which the dyes are separated by hydrochloric acid, being insoluble in alcohol, ether, benzene. Strong reducing agents decompose the dyes. From an alkiline bath cotton is dyed reddish brown tints of an excellent fastness.

In order to illustrate our invention we give the following examples the parts being by weight:

1. The azo-compound of 30.3 parts of 2-aminonaphthol-4.8-disulfonic acid and of 14.5 parts of 1-aminonaphthalene is combined after diazotization with a solution of 9.5 parts of 3-amino-1-methylbenzene, dissolved in hydrochloric acid; a solution of sodium acetate is slowly added. After stirring for some hours, the disazo dye is diazotized with 6 parts of sodium nitrite and hydrochloric acid at the temperature of 0°. The diazo compound is filtered off and suspended in 1200 parts of ice-water and a solution of 8.5 parts of 3-amino-1-methylbenzene in hydrochloric acid is added. Then a solution of 40 parts of sodium acetate is allowed to run to the reacting products. After stirring for some hours the trisazo dye is diazotized by addition of sodium nitrite and hydrochloric acid. The diazo compound being filtered off is suspended in 1200 parts of ice-water and combined with a solution of 12 parts of 4-nitro-1.3-diaminobenzene in 12 parts of hydrochloric acid at 23° Bé. and 300 parts of water. The combination is finished by slowly warming to 60° C. Sodium carbonate is added. The dye is separated in the usual manner.

2. The diazo compound prepared as usual from 17.3 parts of 1-aminobenzene-4-sulfonic acid is combined with 10.7 parts of 1-amino-3-methylbenzene. The reaction begins in the acid solution and is finished by addition of a solution of sodium acetate and by weakly warming. The azo dye is filtered off and dissolved in water by addition of diluted soda lye. 30 parts of concentrated hydrochloric acid and 5.5 parts of sodium nitrite being added. The diazo compound is combined with a solution of 17.9 parts of 1-aminonaphthalene-6-sulfonic acid. The reaction is finished by slow addition of sodium carbonate. 5.5 parts of sodium nitrite are added to the dissolved dyestuff and the solution is allowed to run into diluted hydrochloric acid, a temperature of below 8° being maintained. A solution of 8.6 parts of 1-amino-3-methylbenzene in hydrochloric acid is added to the diazo compound and whilst stirring the reaction is finished by adding slowly a solution of sodium acetate until the reaction of free hydrochloric acid has disappeared. The dyestuff is then separated by addition of an inorganic acid and of common salt and filtered off. The trisazo dye is dissolved in water by addition of sodium carbonate: it is diazotized by 4.2 parts of sodium nitrite in the presence of hydrochloric acid and combined with a solution of 9.3 parts of 4-nitro-1.3-diaminobenzene at a temperature of 15° C. After stirring for 12 hours the free inorganic acid is neutralized with sodium acetate and the combination is finished as usual. The tetrakisazo dye dyes cotton in reddish brown tints of an excellent fastness.

It is obvious that our present invention is not limited to the foregoing examples or to the details given therein.

What we claim is,—

1. The herein-described tetrakisazo dyes being in the shape of their sodium salts dark brown powders soluble in water to reddish brown solutions not being altered by soda lye but from which the dyes are separated by hydrochloric acid, being insoluble in alcohol, ether, benzene, being destroyed by strong reducing agents dyeing cotton reddish brown tints and corresponding to the general formula:

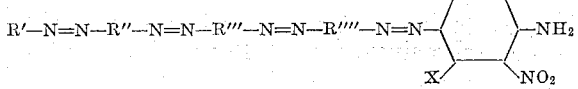

R', R'', R''' being aromatic radicals, R'''' being a radical of the benzene series, X being hydrogen or a univalent substituent.

2. The herein-described tetrakisazo dyes being in the shape of their sodium salts dark brown powders soluble in water to reddish brown solutions not being altered by soda lye but from which the dyes are separated by hydrochloric acid, being insoluble in alcohol, ether, benzene, being destroyed by strong reducing agents, dyeing cotton reddish brown tints and corresponding to the general formula:

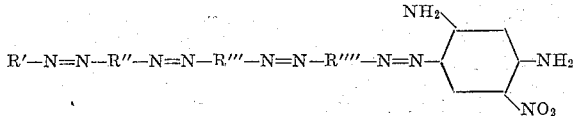

R', R'', R''' being aromatic radicals, R'''' being a radical of the benzene series.

3. The herein-described tetrakisazo dyes being in the shape of their sodium salts dark brown powders soluble in water to reddish brown solutions not being altered by soda lye but from which the dyes are separated by hydrochloric acid, being insoluble in alcohol, ether, benzene, being destroyed by strong reducing agents dyeing cotton reddish brown tints and corresponding to the general formula:

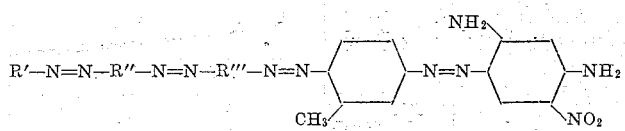

R', R'', R''' being aromatic radicals.

4. The herein-described tetrakisazo dye being in the shape of its sodium salt a dark brown powder soluble in water to a reddish brown solution not being altered by soda lye but from which the dye is separated by hydrochloric acid, being insoluble in alcohol, ether, benzene, being destroyed by strong reducing agents dyeing cotton reddish brown tints and corresponding to the general formula:

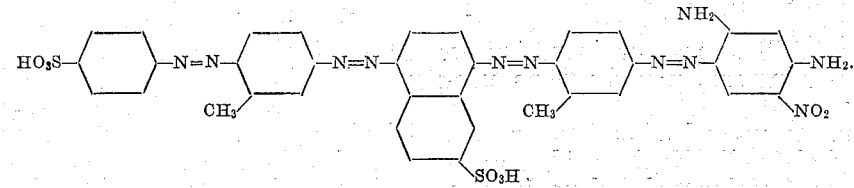

In testimony whereof we affix our signatures.

Dr. WERNER LANGE.
Dr. LUDWIG NEUMANN.

Witnesses:
Dr. MAX BRAUNS,
GUSTAV LUCHT.